(12) United States Patent
Ju (10) Patent No.: US 10,931,395 B2
(45) Date of Patent: Feb. 23, 2021

(54) METHOD AND APPARATUS FOR PHYSICAL LAYER SECURITY COMMUNICATION IN WIRELESS COMMUNICATION SYSTEM

(71) Applicant: ELECTRONICS AND TELECOMMUNICATIONS RESEARCH INSTITUTE, Daejeon (KR)

(72) Inventor: Hyung Sik Ju, Hwaseong-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 16/564,369

(22) Filed: Sep. 9, 2019

(65) Prior Publication Data

US 2020/0092030 A1    Mar. 19, 2020

(30) Foreign Application Priority Data

Sep. 19, 2018    (KR) .................. 10-2018-0112109

(51) Int. Cl.
     *H04K 3/00*      (2006.01)
     *H04L 25/02*      (2006.01)
     *H04L 5/00*      (2006.01)

(52) U.S. Cl.
     CPC .............. *H04K 3/40* (2013.01); *H04L 5/0007* (2013.01); *H04L 5/0053* (2013.01); *H04L 25/0228* (2013.01); *H04K 2203/32* (2013.01); *H04K 2203/36* (2013.01)

(58) Field of Classification Search
     CPC .............. H04K 3/00–2203/36; H04L 27/2695
     See application file for complete search history.

(56) References Cited

U.S. PATENT DOCUMENTS

| | | | |
|---|---|---|---|
| 9,496,982 B2 | 11/2016 | Purohit | |
| 9,686,038 B2 | 6/2017 | Shapira | |
| 9,699,664 B2 | 7/2017 | Jover | |
| 10,348,446 B1 * | 7/2019 | Sun | H04L 1/0025 |
| 2002/0177447 A1 * | 11/2002 | Walton | H04B 7/0626 455/452.1 |
| 2009/0323845 A1 * | 12/2009 | Bank | H04L 27/0008 375/261 |
| 2010/0266055 A1 * | 10/2010 | Mueck | H04L 5/0039 375/260 |
| 2013/0266142 A1 | 10/2013 | Hwang et al. | |
| 2013/0343334 A1 * | 12/2013 | Papasakellariou | H04L 5/0053 370/329 |
| 2015/0023503 A1 | 1/2015 | Baek et al. | |

(Continued)

*Primary Examiner* — Raymond S Dean
(74) *Attorney, Agent, or Firm* — LRK Patent Law Firm (57) ABSTRACT

An operation method of a terminal in a wireless communication system includes receiving a preamble sequence from a base station; estimating a UL channel between the terminal and the base station based on the preamble sequence; determining a first frequency region for transmitting a data signal and a second frequency region for transmitting a jamming signal in an entire frequency region of the UL channel based on a result of estimating the UL channel; and transmitting to the base station a UL control signal including identification information for identifying the first frequency region and the second frequency region.

14 Claims, 7 Drawing Sheets

(56) References Cited

U.S. PATENT DOCUMENTS

| 2015/0146872 A1 | 5/2015 | Baek et al. |
| 2018/0167807 A1 | 6/2018 | Ying et al. |
| 2018/0198766 A1 | 7/2018 | Moon et al. |
| 2019/0181974 A1* | 6/2019 | Ju ................ H04W 72/0453 |

* cited by examiner

METHOD AND APPARATUS FOR PHYSICAL LAYER SECURITY COMMUNICATION IN WIRELESS COMMUNICATION SYSTEM

CROSS-REFERENCE TO RELATED APPLICATION

This application claims priority to Korean Patent Application No. 10-2018-0112109, filed on Sep. 19, 2018 in the Korean Intellectual Property Office (KIPO), the entire content of which is hereby incorporated by reference.

BACKGROUND

1. Technical Field

The present disclosure relates to a wireless communication system, and more particularly, to an apparatus and a method for physical layer security communication.

2. Description of Related Art

Generally, in a wireless communication system, a security scheme utilizing a security key shared by a transmitter and a receiver may be utilized to prevent eavesdropping and radio monitoring. However, the security scheme utilizing the security key has a problem in that security cannot be maintained when the security key shared by the transmitted and the receiver is leaked.

In addition, a physical layer security scheme has a disadvantage in that it is possible to optimally design the transmitter by knowing channel information between the transmitter and an eavesdropper. In the physical layer security scheme, when the transmitter does not know a channel between the transmitter and the eavesdropper, an artificial noise or jamming signal may be applied to a null space of the channel between the transmitter and the receiver using a plurality of antennas in order to maintain security. However, in the physical layer security scheme, there is a problem in that the transmitter should use a plurality of antennas to maintain security when the transmitter does not know the channel between the transmitter and the eavesdropper.

In addition, the physical layer security scheme has a problem in that security cannot be maintained also when the number of antennas of the eavesdropper exceeds the number of antennas of the transmitter. Accordingly, the physical layer security scheme has a problem in that the maintenance of security is limited in a bi-directional communication environment depending on the number of antennas of the transmitter.

SUMMARY

Accordingly, embodiments of the present disclosure provide an apparatus and a method for performing physical layer security communication without additional channel information related to an eavesdropper nor an additional security key which is generated in advance and shared by a transmitter and a receiver in a multi-subcarrier wireless communication system based on a single antenna or multiple antennas.

In order to achieve the objective of the present disclosure, an operation method of a terminal in a wireless communication system may comprise receiving a preamble sequence from a base station; estimating an uplink (UL) channel between the terminal and the base station based on the preamble sequence; determining a first frequency region for transmitting a data signal and a second frequency region for transmitting a jamming signal in an entire frequency region of the UL channel based on a result of estimating the UL channel; and transmitting to the base station a UL control signal including identification information for identifying the first frequency region and the second frequency region.

The identification information may indicate an amplitude threshold, the first frequency region may be a frequency region in which a signal having an amplitude equal to or greater than the amplitude threshold is transmitted in the entire frequency region of the UL channel, and the second frequency region may be a frequency region in which a signal having an amplitude less than the amplitude threshold is transmitted in the entire frequency region of the UL channel.

The identification information may indicate a phase threshold, the first frequency region may be a frequency region in which a signal having an amplitude equal to or greater than the phase threshold is transmitted in the entire frequency region of the UL channel, and the second frequency region may be a frequency region in which a signal having a phase less than the phase threshold is transmitted in the entire frequency region of the UL channel.

The identification information may indicate a first amplitude threshold and a second amplitude threshold, the first frequency region may be a frequency region in which a signal having an amplitude equal to or greater than the first amplitude threshold and less than the second amplitude threshold is transmitted in the entire frequency region of the UL channel, the second frequency region may be a frequency region in which a signal having an amplitude less than the first amplitude threshold and a signal having an amplitude equal to or greater than the second amplitude threshold are transmitted in the entire frequency region of the UL channel, and the first amplitude threshold may be less than the second amplitude threshold.

The identification information may indicate a first phase threshold and a second phase threshold, the first frequency region may be a frequency region in which a signal having a phase equal to or greater than the first phase threshold and less than the second phase threshold is transmitted in the entire frequency region of the UL channel, the second frequency region may be a frequency region in which a signal having a phase less than the first phase threshold and a signal having a phase equal to or greater than the second phase threshold are transmitted in the entire frequency region of the UL channel, and the first phase threshold may be less than the second phase threshold.

The identification information may indicate an amplitude threshold and a phase threshold, the first frequency region may be a frequency region in which a signal having an amplitude equal to or greater than the amplitude threshold and a phase equal to or greater than the phase threshold is transmitted in the entire frequency region of the UL channel, and the second frequency region may be a frequency region in which a signal having an amplitude less than the amplitude threshold and a signal less than the phase threshold are transmitted in the entire frequency region of the UL channel.

The identification information may be transmitted to the base station through a physical uplink shared channel (PUSCH).

The identification information may be transmitted to the base station through a signal (SIG) field included in a preamble of a frame.

The operation method may further comprise transmitting to the base station a UL transmission signal including the data signal and the jamming signal through the UL channel.

In order to achieve the objective of the present disclosure, an operation method of a base station in a wireless communication system may comprise receiving an uplink (UL) control signal including identification information for identifying a first frequency region in which a data signal is transmitted and a second frequency region in which a jamming signal is transmitted from a terminal through a UL channel; receiving a UL transmission signal including the data signal and the jamming signal from the terminal through the UL channel; identifying the first frequency region and the second frequency region among an entire frequency regions of the UL channel based on the identification information; and decoding the data signal received through the first frequency region.

the identification information indicates an amplitude threshold, the first frequency region is a frequency region in which a signal having an amplitude equal to or greater than the amplitude threshold is received in the entire frequency region of the UL channel, and the second frequency region is a frequency region in which a signal having an amplitude less than the amplitude threshold is received in the entire frequency region of the UL channel.

The identification information may indicate a phase threshold, the first frequency region may be a frequency region in which a signal having an amplitude equal to or greater than the phase threshold is received in the entire frequency region of the UL channel, and the second frequency region may be a frequency region in which a signal having a phase less than the phase threshold is received in the entire frequency region of the UL channel.

The identification information may indicate a first amplitude threshold and a second amplitude threshold, the first frequency region may be a frequency region in which a signal having an amplitude equal to or greater than the first amplitude threshold and less than the second amplitude threshold is received in the entire frequency region of the UL channel, the second frequency region may be a frequency region in which a signal having an amplitude less than the first amplitude threshold and a signal having an amplitude equal to or greater than the second amplitude threshold are received in the entire frequency region of the UL channel, and the first amplitude threshold may be less than the second amplitude threshold.

The identification information may indicate a first phase threshold and a second phase threshold, the first frequency region may be a frequency region in which a signal having a phase equal to or greater than the first phase threshold and less than the second phase threshold is received in the entire frequency region of the UL channel, the second frequency region may be a frequency region in which a signal having a phase less than the first phase threshold and a signal having a phase equal to or greater than the second phase threshold are received in the entire frequency region of the UL channel, and the first phase threshold may be less than the second phase threshold.

The identification information may indicate an amplitude threshold and a phase threshold, the first frequency region may be a frequency region in which a signal having an amplitude equal to or greater than the amplitude threshold and a phase equal to or greater than the phase threshold is received in the entire frequency region of the UL channel, and the second frequency region may be a frequency region in which a signal having an amplitude less than the amplitude threshold and a signal less than the phase threshold are received in the entire frequency region of the UL channel.

The identification information may be received from the user terminal through a physical uplink shared channel (PUSCH).

The identification information may be received from the user terminal through a signal (SIG) field included in a preamble of a frame.

The jamming signal received through the second frequency region may not be decoded by the base station.

According to the embodiments of the present disclosure, in a wireless communication system, a user terminal and a base station can distinguish subcarriers through which data symbols are transmitted and subcarriers through which jamming symbols are transmitted based on an amplitude threshold or a phase threshold of a channel therebetween, without an additional security key shared by the user terminal and the base station.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein. Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

Throughout the specification, a terminal may be a mobile terminal (MT), a mobile station (MS), an advanced mobile station (AMS), a high reliability mobile station (HR-MS), a subscriber station (SS), a portable subscriber station (PSS), an access terminal (AT), a user equipment (UE), or the like, and may have all or a part of functions of the MT, MS, AMS, HR-MS, SS, PSS, AT, UE, or the like.

Also, a base station (BS) may be an advanced base station (ABS), a high reliability base station (HR-BS), a node B (NodeB), an evolved node B (eNodeB), an access point (AP), a radio access station (RAS), a base transceiver station (BTS), a mobile multi-hop relay (MMR) BS, a relay station (RS) performing a role of base station, a high reliability relay station (HR-RS) performing a role of base station, a small station, or the like, and may have all or a part of functions of the ABS, HR-BS, Node B, eNodeB, AP, RAS, BTS, MMR-BS, RS, HR-RS, small base station, or the like.

The present disclosure relates to a data transmission and reception method using a physical layer security (PHYSEC) scheme, in which a transmitter and a receiver can perform secure communications using a radio channel characteristic of a physical layer without sharing a secret key. In the physical layer security scheme, a radio channel itself between the transmitter and the receiver may operate as a security key. Accordingly, since there is no security key in the physical layer security scheme, there is no fear that the security key will be leaked. First, a wireless communication system according to a first embodiment of the present disclosure will be described with reference to FIG. 1.

Figure 1:
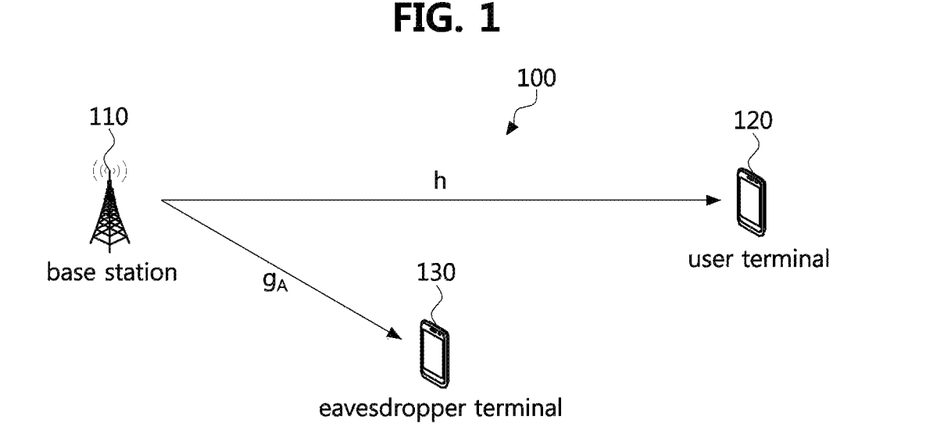
FIG. 1 is a conceptual diagram illustrating a wireless communication system according to a first embodiment of the present disclosure.

FIG. 1 is a conceptual diagram illustrating a wireless communication system according to a first embodiment of the present disclosure.

Referring to FIG. 1, a wireless communication system 100 may comprise a base station 110, a user terminal 120, and an eavesdropper terminal 130.

Each of the base station 110, the user terminal 120, and the eavesdropper terminal 130 may support at least one communication protocol. Here, the communication protocol may include a communication protocol based on a code division multiple access (CDMA), a communication protocol based on a wideband CDMA (WCDMA), a communication protocol based on a time division multiple access (TDMA), a communication protocol based on a frequency division multiple access (FDMA), a communication protocol based on an orthogonal frequency division multiplexing (OFDM), a communication protocol based on an orthogonal frequency division multiple access (OFDMA), a communication protocol based on a single carrier-FDMA (SC-FDMA), a communication protocol based on a non-orthogonal multiple access (NOMA), and a communication protocol based on a space division multiple access (SDMA).

The user terminal 120 may receive a signal from the base station 110 through a channel h. The eavesdropper terminal 130 may receive a signal from the base station 110 through a channel $g_A$.

Here, the channel h and the channel $g_A$ may be multipath fading channels whose frequency selectivity is equal to or greater than a predetermined threshold. Also, the base station 110, the user terminal 120, and the eavesdropper terminal 130 may be spaced apart from each other by a predetermined threshold distance or more. Accordingly, the channel h and the channel $g_A$ may be channels formed independently of each other. In addition, a coherence time of each of the channel h and the channel $g_A$ may exceed a predetermined threshold time.

The base station 110 may transmit information to the user terminal 120 through the channel h. For example, the base station 110 may transmit data to the user terminal 120 based on multiple-subcarrier transmission such as the orthogonal frequency division multiplexing (OFDM) scheme. The user terminal 120 may receive the information from the base station 110 through the channel h. Here, the eavesdropper terminal 130 may attempt to eavesdrop or tap the information transmitted from the base station 110 to the terminal 120 through the channel $g_A$.

Here, a structure of each of the base station 110, the user terminal 120, and the eavesdropper terminal 130 will be described with reference to FIG. 2.

Figure 2:
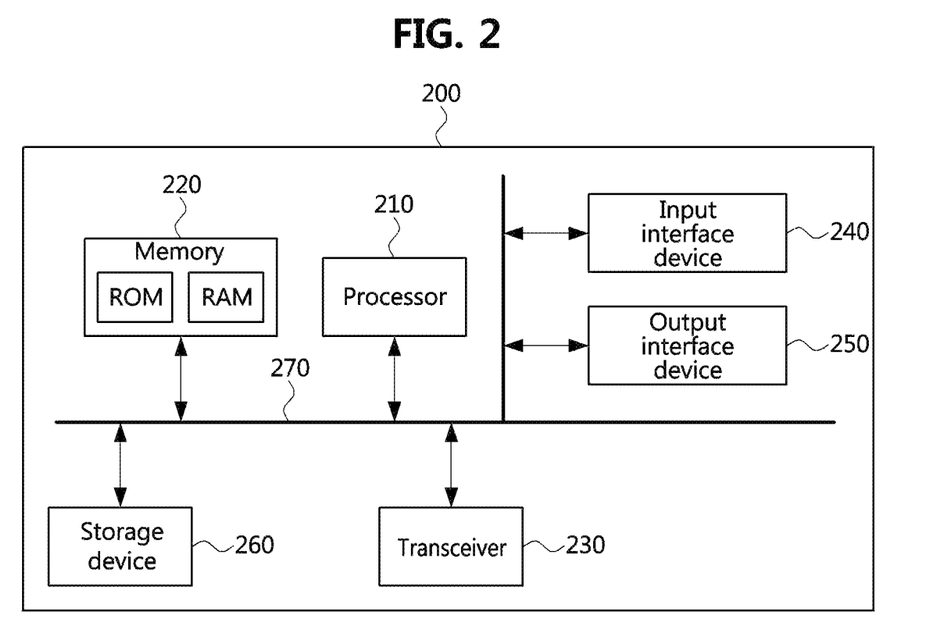
FIG. 2 is a block diagram illustrating a communication node in a communication system according to a first embodiment of the present disclosure.

FIG. 2 is a block diagram illustrating a communication node in a wireless communication system according to a first embodiment of the present disclosure.

Referring to FIG. 2, a communication node 200 may be the same as or similar to at least one of the base station 110, the user terminal 120, and the eavesdropper terminal 130 of FIG. 1. The communication node 200 may comprise at least one processor 210, a memory 220, and a transceiver 230 connected to the network for performing communications.

Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Here, signal flows between the base station 110 and the user terminal 120 will be described with reference to FIG. 3.

Figure 3:
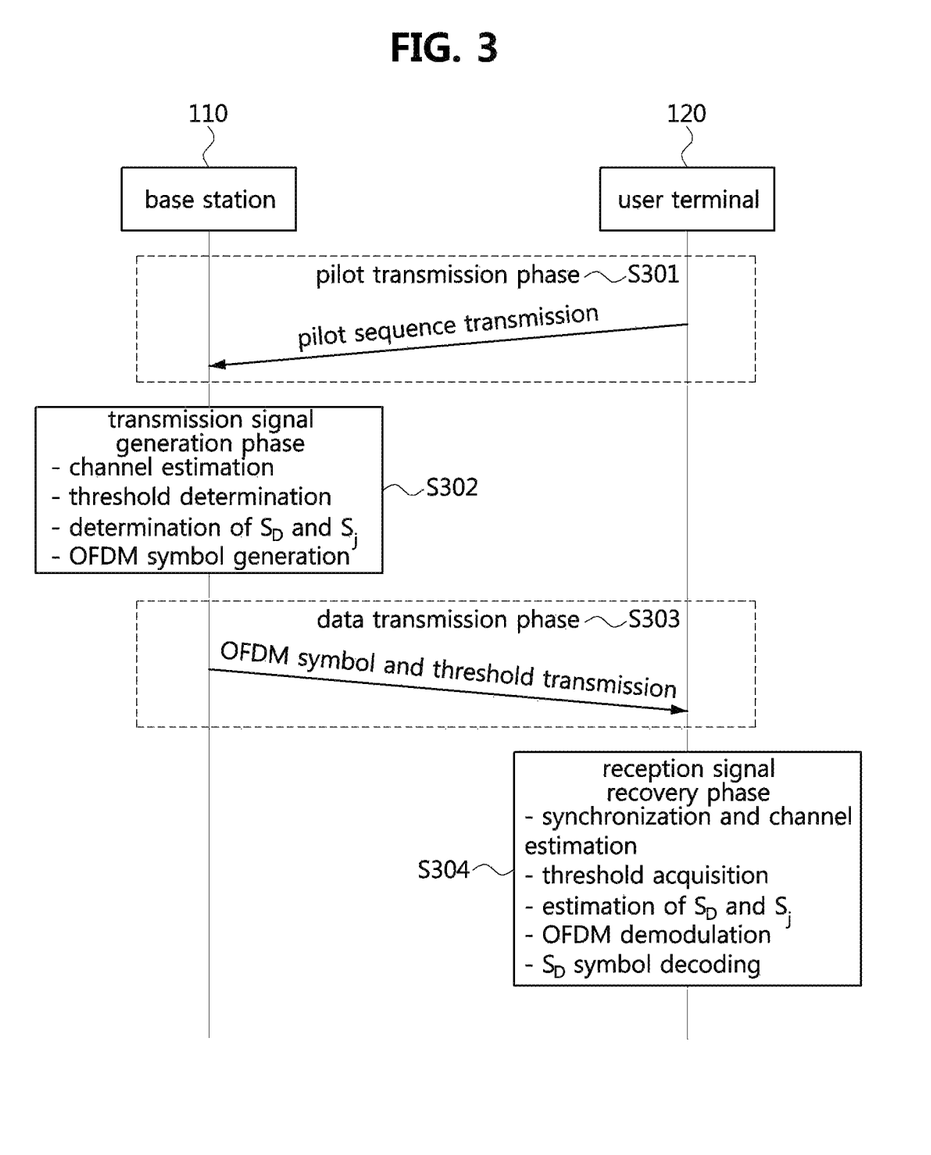
FIG. 3 is a sequence chart illustrating signal flows between a base station and a user terminal in a wireless communication system according to a first embodiment of the present disclosure.

FIG. 3 is a sequence chart illustrating signal flows between a base station and a user terminal in a wireless communication system according to a first embodiment of the present disclosure.

Referring to FIG. 3, a wireless communication system may include the base station 110 and the user terminal 120. Here, the base station 110 may be the same as the base station 110 of FIG. 1. Also, the user terminal 120 may be the same as the user terminal 120 of FIG. 1.

In a pilot transmission phase S301, the user terminal 120 may transmit a pilot sequence to the base station 110. The base station 110 may receive the pilot sequence transmitted from the user terminal 120. Here, the pilot sequence may be a preamble sequence.

In a transmission signal generation phase S302, the base station 110 may estimate a channel from the user terminal 120 to the base station 110 based on the pilot sequence received from the user terminal 120. In this case, it may be assumed that an uplink (UL) channel from the user terminal 120 to the base station 110 and a downlink (DL) channel from the base station 110 to the user terminal 120 are the same due to channel reciprocity. That is, the base station 110 may estimate the channel between the base station 110 and the user terminal 120 based on the pilot sequence received from user terminal 120. Here, the channel between the base station 110 and the user terminal 120 may be the same as or similar to the channel h in FIG. 1. That is, the base station 110 may generate channel estimation information with respect to the channel h.

The base station 110 may determine an amplitude threshold or a phase threshold in a frequency domain of the channel h between the base station 110 and the terminal 120 based on the channel estimation information.

Here, a procedure of determining the amplitude threshold will be described with reference to FIG. 4 below, and a procedure of determining the phase threshold will be described with reference to FIG. 5 below.

Figure 4:
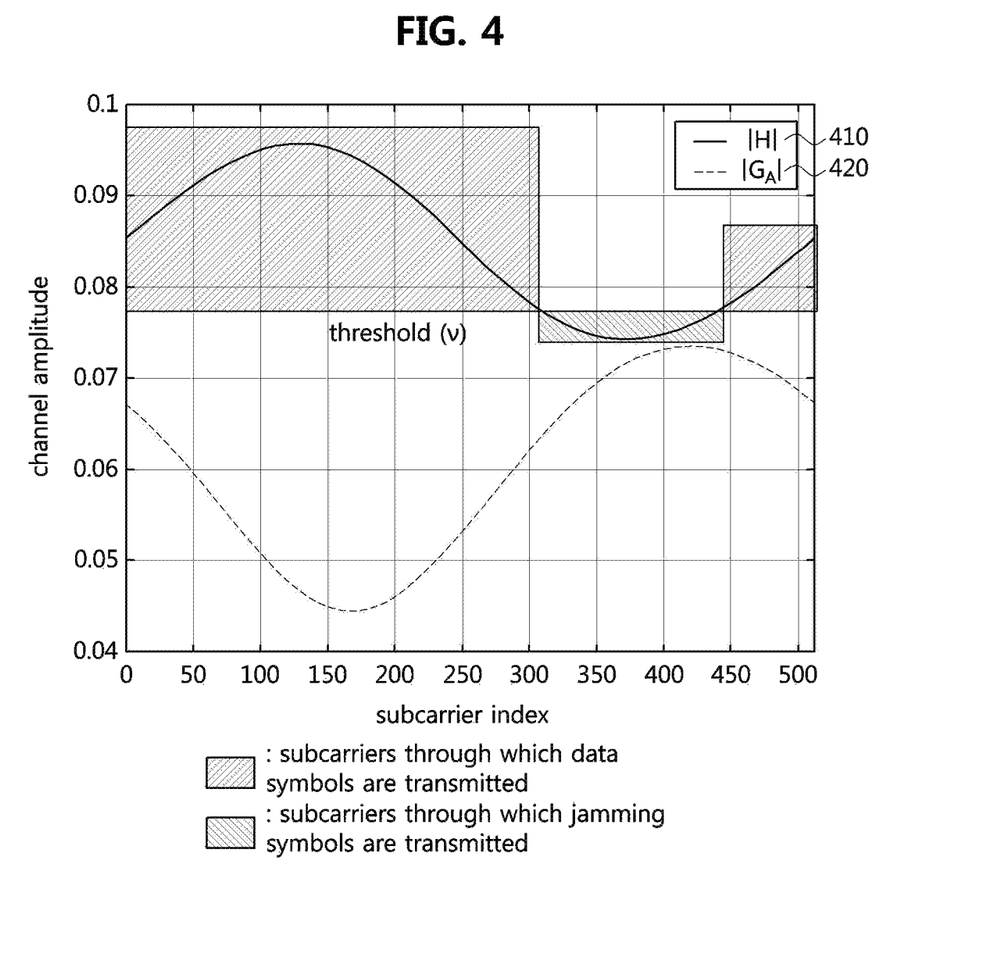
FIG. 4 is a graph illustrating an amplitude according to a subcarrier index in a frequency domain of a channel estimated by a base station in a wireless communication system according to a first embodiment of the present invention.

FIG. 4 is a graph illustrating an amplitude according to a subcarrier index in a frequency domain of a channel estimated by a base station in a wireless communication system according to a first embodiment of the present invention.

Referring to FIG. 4, H may be a function representing the channel h between the base station 110 and the user terminal 120 in the frequency domain. Also, $G_A$ may be a function representing the channel $g_A$ between the base station 110 and the eavesdropper terminal 130 in the frequency domain.

For example, when the number of subcarriers (e.g., corresponding a fast Fourier transform (FFT) size) is N, H and $G_A$ may be expressed as follows.

$$H=\mathit{fft}(h)=[H(0),H(1),\ldots,H(N-1)]$$

$$G_A=\mathit{fft}(g_A)=[G_A(0),G_A(1),\ldots,G_A(N-1)]$$

In FIG. 4, N is assumed to be 512.

The base station 110 may determine a first set $S_D$ of subcarriers for transmitting data symbols based on a predetermined amplitude threshold v. The base station 110 may also determine a second set $S_j$ of subcarriers for transmitting jamming symbols based on the amplitude threshold v. For example, the base station 110 may determine the first subcarrier set $S_D$ and the second subcarrier set $S_j$ through Equation 1 below.

$$S_D=\{k||H(k)|\geq v, k=0,1,\ldots N-1\}$$

$$S_j=\{k||H(k)|<v, k=0,1,\ldots N-1\}$$

Here, |H(k)| may mean an amplitude of a signal received in a frequency corresponding to a subcarrier index k.

That is, the first subcarrier set $S_D$ may be a set of subcarriers having an amplitude equal to or greater than the amplitude threshold v at the frequency domain H. Also, the second subcarrier set $S_j$ may be a set of subcarriers having an amplitude less than the amplitude threshold v at the frequency domain H.

The base station 110 may determine the amplitude threshold v based on the amount of data traffic that the base station transmits to the user terminal 120. For example, the base station 110 may increase the number of subcarriers used for transmitting data symbols by decreasing the amplitude threshold v when there is a large amount of data traffic to be transmitted to the user terminal 120. On the other hand, when the amount of data traffic to be transmitted to the user terminal 120 is small, the base station 110 may reduce the number of subcarriers used for transmitting data symbols by increasing the amplitude threshold v.

For example, the base station 110 may determine the amplitude threshold v as 0.078 based on the amount of data traffic to be transmitted to the user terminal 120. Accordingly, the base station 110 may determine subcarriers having an amplitude of 0.078 or more in the frequency domain H of the channel h as the first subcarrier set $S_D$ comprising subcarriers to which the data symbols are mapped. Also, the base station 110 may determine subcarriers having an amplitude less than 0.078 in the frequency domain H of the channel h as the second subcarrier set $S_j$ comprising subcarriers to which jamming symbols are mapped.

For example, the base station 110 may determine subcarriers 0 to 310 and 440 to 511 having the amplitude of 0.078 or more in the frequency domain H of the channel h as the first subcarrier set $S_D$ comprising subcarrier to which the data symbols are mapped. Also, the base station 110 may determine subcarriers 311 to 439 in the frequency domain H of the channel h as the second subcarrier set $S_j$ comprising subcarrier to which the jamming symbols are mapped.

Further, the base station 110 may determine the first subcarrier set $S_D$ for transmitting the data symbols and the second subcarrier set $S_j$ for transmitting the jamming symbols based on the phase threshold u. A procedure of determining the phase threshold will be described with reference to FIG. 5 below.

Figure 5:
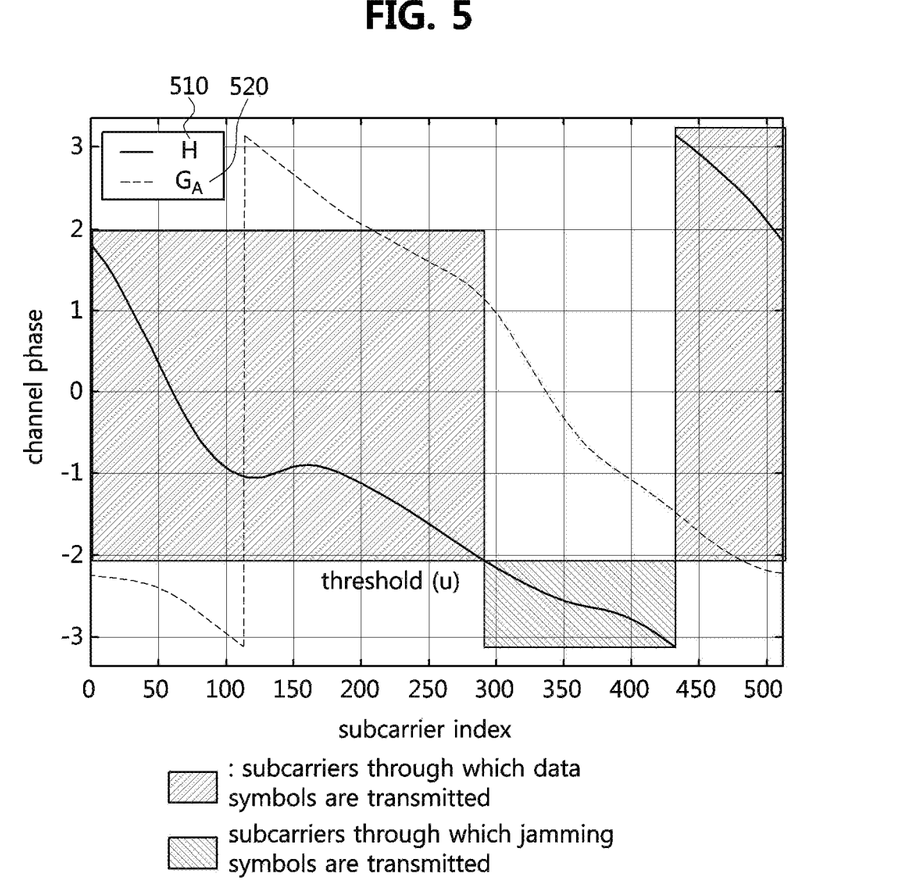
FIG. 5 is a graph illustrating a phase according to a subcarrier index in a frequency domain of a channel estimated by a base station in a wireless communication system according to a first embodiment of the present invention.

FIG. 5 is a graph illustrating a phase according to a subcarrier index in a frequency domain of a channel estimated by a base station in a wireless communication system according to a first embodiment of the present invention.

Referring to FIG. 5, H may be the function representing the channel h between the base station 110 and the user terminal 120 in the frequency domain. Also, $G_A$ may be the function representing the channel $g_A$ between the base station 110 and the eavesdropper terminal 130 in the frequency domain.

For example, when the number of subcarriers (e.g., corresponding a FFT size) is N, H and $G_A$ may be expressed as follows.

$$H = fft(h) = [H(0), H(1), \ldots, H(N-1)]$$

$$G_A = fft(g_A) = [G_A(0), G_A(1), \ldots, G_A(N-1)]$$

In FIG. 5, N is assumed to be 512 as in FIG. 4.

The base station 110 may determine an arbitrary phase threshold u. The base station 110 may determine a first subcarrier set $S_D$ for transmitting data symbols and a second subcarrier set $S_j$ for transmitting jamming symbols based on the phase threshold u. Here, the arbitrary phase threshold u may be represented by a real number between $-\pi$ and $\pi$.

For example, the base station 110 may determine the first subcarrier set $S_D$ and the second subcarrier set $S_j$ through Equation 2 below.

$$S_D = \left\{ k \,\middle|\, \tan^{-1} \frac{Re(H(k))}{Im(H(k))} \geq u, k = 0, 1, \ldots N-1 \right\} \quad \text{[Equation 2]}$$

$$S_J = \left\{ k \,\middle|\, \tan^{-1} \frac{Re(H(k))}{Im(H(k))} < u, k = 0, 1, \ldots N-1 \right\}$$

Here, Re(H(k)) may a real number of the frequency domain H corresponding to a subcarrier index k. Also, Im(H(k)) may mean an imaginary number of the frequency domain H corresponding to the subcarrier index k.

That is, $$\tan^{-1} \frac{Re(H(k))}{Im(H(k))}$$

may mean a phase of a signal received through a subcarrier indicated by the subcarrier index k in the frequency domain H of the channel h.

That is, the first subcarrier set $S_D$ may be a set of subcarriers having a phase equal to or greater than the phase threshold u in the frequency domain H of the channel h. Also, the second subcarrier set $S_j$ may be a set of subcarriers having a phase less than phase threshold u in the frequency domain H of the channel h.

The base station 110 may determine the phase threshold u based on the amount of data traffic that the base station transmits to the user terminal 120. For example, the base station 110 may increase the number of subcarriers used for transmitting data symbols by decreasing the phase threshold u when there is a large amount of data traffic to be transmitted to the user terminal 120. On the other hand, when the amount of data traffic to be transmitted to the user terminal 120 is small, the base station 110 may reduce the number of subcarriers used for transmitting data symbols by increasing the phase threshold u.

For example, the base station 110 may determine the phase threshold u as $-2.1$ based on the amount of data traffic to be transmitted to the user terminal 120. Accordingly, the base station 110 may determine subcarriers having a phase of $-2.1$ or more in the frequency domain H of the channel h as the first subcarrier set $S_D$ comprising subcarriers to which the data symbols are mapped. Further, the base station 110 may determine subcarriers having a phase less than $-2.1$ in the frequency domain H of the channel h as the second subcarrier set $S_j$ comprising subcarriers to which jamming symbols are mapped.

For example, the base station 110 may determine subcarriers 0 to 295 and 437 to 511 in the frequency domain H of the channel h as the first subcarrier set $S_D$ comprising subcarrier to which the data symbols are mapped. Also, the base station 110 may determine subcarriers 296 to 436 in the frequency domain H of the channel h as the second subcarrier set $S_j$ comprising subcarrier to which the jamming symbols are mapped.

The range of the first subcarrier set $S_D$ and the second subcarrier set $S_j$ may vary according to the phase threshold. For example, the base station 110 may determine the first subcarrier set $S_D$ and the second subcarrier set $S_j$ through Equation 3 below.

$$S_D = \left\{ k \,\middle|\, \tan^{-1} \frac{Re(H(k))}{Im(H(k))} \leq u, k = 0, 1, \ldots N-1 \right\} \quad \text{[Equation 3]}$$

$$S_J = \left\{ k \,\middle|\, \tan^{-1} \frac{Re(H(k))}{Im(H(k))} > u, k = 0, 1, \ldots N-1 \right\}$$

Referring to Equation 3, the first subcarrier set $S_D$ may be a set of subcarriers having a phase less than or equal to the phase threshold u in the frequency domain H of the channel h. Also, the second subcarrier set $S_j$ may be a set of subcarriers having a phase greater than the phase threshold u in the frequency domain H of the channel h.

The base station 110 may configure a plurality of thresholds based on the amount of data traffic to be transmitted to the user terminal 120. The base station 110 may determine the size of the first subcarrier set $S_D$ for transmitting data symbols by configuring a plurality of thresholds according to the amount of data traffic to be transmitted to the user terminal 120.

For example, the first subcarrier set $S_D$ and the second subcarrier set $S_j$ may be determined through a plurality of phase thresholds. For example, the base station 110 may determine the first subcarrier set $S_D$ and the second subcarrier set $S_j$ through a first phase threshold $u_1$ and a second phase threshold $u_2$ as shown in Equation 4 below.

$$S_D = \left\{ k \,\middle|\, u_1 \geq \tan^{-1} \frac{Re(H(k))}{Im(H(k))} \geq u_2, k = 0, 1, \ldots N-1 \right\} \quad \text{[Equation 4]}$$

$$S_J = \left\{ k \,\middle|\, \tan^{-1} \frac{Re(H(k))}{Im(H(k))} < u_2, \right.$$

$$\left. \tan^{-1} \frac{Re(H(k))}{Im(H(k))} > u_1, k = 0, 1, \ldots N-1 \right\}$$

Here, the first phase threshold $u_1$ may exceed the second phase threshold $u_2$.

Referring to Equation 4, the first subcarrier set $S_D$ may be a set of subcarriers having a phase that is less than or equal to the first phase threshold $u_1$ and equal to or greater than the second phase threshold $u_2$ in the frequency domain H of the channel h. Also, the second subcarrier set $S_j$ may be a set of subcarriers having a phase less than the second phase threshold $u_2$ in the frequency domain H of the channel h and subcarrier having a phase greater than the first phase threshold u1 in the frequency domain H of the channel h.

Alternatively, the first subcarrier set $S_D$ and the second subcarrier set $S_j$ may be determined through Equation 5 below.

$$S_D = \left\{ k \left| \tan^{-1} \frac{Re(H(k))}{Im(H(k))} \leq u_2, \right. \right.$$

$$\left. \tan^{-1} \frac{Re(H(k))}{Im(H(k))} \geq u_1, k = 0, 1, \ldots N-1 \right\}$$

$$S_J = \left\{ k \left| u_1 > \tan^{-1} \frac{Re(H(k))}{Im(H(k))} > u_2, k = 0, 1, \ldots N-1 \right. \right\}$$

[Equation 5]

Here, the first phase threshold $u_1$ may exceed the second phase threshold $u_2$.

Referring to Equation 5, the first subcarrier set $S_D$ may be a set of subcarriers having a phase less than or equal to the second phase threshold $u_2$ in the frequency domain H, and subcarriers having a phase equal to or greater than the first phase threshold $u_1$ in the frequency domain H. Also, the second subcarrier set $S_j$ may be a set of subcarriers having a phase that is less than the first phase threshold $u_1$ and greater than the second phase threshold $u_2$ in the frequency domain H of the channel h.

Further, the first subcarrier set $S_D$ and the second subcarrier set $S_j$ may be determined based on the amplitude threshold v and the phase threshold u. For example, the base station 110 may determine the first subcarrier set $S_D$ and the second subcarrier set $S_j$ through Equation 6 below.

$$S_D = $$

$$\left\{ k \left| |H(k)| \geq v, \tan^{-1} \frac{Re(H(k))}{Im(H(k))} \geq u_1, k = 0, 1, \ldots N-1 \right. \right\}$$

$$S_J = \left\{ k \left| |H(k)| < v, \tan^{-1} \frac{Re(H(k))}{Im(H(k))} < u_1, k = 0, 1, \ldots N-1 \right. \right\}$$

[Equation 6]

Referring to Equation 6, the first subcarrier set $S_D$ may be a set of subcarriers having an amplitude equal to or greater than the amplitude threshold v and a phase equal to or greater than the phase threshold u in the frequency domain H of the channel h. Also, the second subcarrier set $S_j$ may be a set of subcarriers having an amplitude less than the amplitude threshold v and a phase less than the phase threshold u in the frequency domain H of the channel h.

Alternatively, the first subcarrier set $S_D$ and the second subcarrier set $S_j$ may be determined through Equation 7 below.

$$S_D = $$

$$\left\{ k \left| |H(k)| \geq v, \tan^{-1} \frac{Re(H(k))}{Im(H(k))} \leq u_1, k = 0, 1, \ldots N-1 \right. \right\}$$

$$S_J = \left\{ k \left| |H(k)| < v, \tan^{-1} \frac{Re(H(k))}{Im(H(k))} > u_1, k = 0, 1, \ldots N-1 \right. \right\}$$

[Equation 7]

Referring to Equation 7, the first subcarrier set $S_D$ may be a set of subcarriers having an amplitude equal to or greater than the amplitude threshold v and a phase equal to or less than the phase threshold u in the frequency domain H of the channel h. Also, the second subcarrier set $S_j$ may be a set of subcarriers having an amplitude less than the amplitude threshold v and a phase greater than the phase threshold u in the frequency domain H of the channel h.

The first subcarrier set $S_D$ and the second subcarrier set $S_j$ may be determined based on a plurality of amplitude thresholds and a plurality of phase thresholds in the frequency domain H of the channel h. The method of determining the first subcarrier set $S_D$ and the second subcarrier set $S_j$ other than the above-described method may be various.

Referring back to FIG. 3, the base station 110 may generate a DL transmission signal including the data symbols and the jamming symbols. For example, the base station 110 may encode the data symbols in a phase shift keying (PSK) scheme or a quadrature amplitude modulation (QAM) scheme, and map the data symbols to the subcarriers included in the first subcarrier set $S_D$. Also, the base station 110 may encode the jamming symbols using random bits in the PSK scheme or the QAM scheme, and map the jamming symbols to the subcarriers included in the second subcarrier set $S_j$. The base station 110 may generate OFDM symbols by performing OFDM modulation on the data symbols and the jamming symbols. That is, the base station 110 may perform inverse fast Fourier transform (IFFT), and perform a cyclic prefix (CP) addition.

In a data transmission phase S303, the base station 110 may transmit at least one of the amplitude threshold v and the phase threshold u to the user terminal 120.

For example, the base station 110 may transmit at least one of the thresholds to the user terminal 120. Here, the eavesdropper terminal 130 may eavesdrop on at least one of the thresholds from the base station 110. The eavesdropper terminal 130 may be the same as or similar to the eavesdropper terminal 130 of FIG. 1. However, as long as the frequency domain H of the channel h and the frequency domain $G_A$ of the channel $g_A$ do not exactly coincide with each other, the eavesdropper terminal 130 cannot correctly distinguish the first subcarrier set $S_D$ and the second subcarrier set $S_j$ based on the at least one of the thresholds.

In particular, when the frequency selective fading that selectively causes fading increases in the frequency domain H, the eavesdropper terminal 130 cannot further precisely distinguish the first subcarrier set $S_D$ and the second subcarrier set $S_j$.

Also, as the difference in channel power gains of the frequency domain H and the frequency domain $G_A$ increases due to path loss or large scale fading, the eavesdropper terminal 130 cannot further distinguish the first subcarrier set $S_D$ and the second subcarrier set $S_j$.

Especially, in FIG. 4, since the amplitudes of all the subcarriers of the frequency domain $G_A$ are less than the amplitude threshold 0.078, even when the eavesdropper terminal 130 eavesdrops on the amplitude threshold v, the eavesdropper terminal 130 may determine that the data symbols are not transmitted through the subcarriers of the frequency domain $G_A$.

Also, in FIG. 5, when the eavesdropper terminal 130 eavesdrops on the phase threshold u, the eavesdropper terminal 130 may determine symbols of the subcarriers 0 to 120 and 480 to 511 in the frequency domain $G_A$ of the channel $g_A$ as the jamming symbols based on the phase threshold u. Also, the eavesdropper terminal 130 may determine symbols of the subcarriers 121 to 479 in the frequency domain $G_A$ of the channel $g_A$ as the data symbols based on the phase threshold u.

Accordingly, the base station 110 may acquire security at the physical layer by transmitting at least one threshold to the user terminal 120 without a security key shared with the user terminal 120. Also, the at least one threshold may not require a separate signal or channel not defined in the existing specification.

Here, a method for transmitting the at least one threshold may differ depending on the wireless communication system.

For example, the wireless communication system may be a wireless local area network (WLAN). Here, the WLAN may be wireless fidelity (Wi-Fi). In this case, the base station 110 may correspond to an access point (AP) of the WLAN. The base station 110 may transmit the at least one threshold to the user terminal 120 through a signal (SIG) field included in a preamble of a frame. Here, the SIG field may be a high efficiency SIG (HE-SIG) field, a very high throughput signal (VHT-SIG) field, or a legacy signal (L-SIG) field.

Also, the wireless communication system may be a mobile (cellular) communication system. For example, the wireless communication system may be a long term evolution (LTE) or a new radio (NR) system. The at least one threshold may be transmitted to the user terminal 120 through reserved bits in a downlink control information (DCI) of a physical downlink control channel (PDCCH).

The base station 110 may transmit OFDM symbols including data symbols and jamming symbols to the user terminal 120. In case that the base station 110 is an AP of a WLAN, the base station 110 may transmit OFDM symbols to the user terminal 120 through a data field of the frame. Also, when the base station 110 is a base station of the LTE or NR system, the base station 110 may transmit the OFDM symbols to the user terminal 120 through a physical downlink shared channel (PDSCH).

The base station 110 may transmit to the user terminal 120 the OFDM symbols including the jamming symbols and the data symbols and a signal including the at least one threshold. The user terminal 120 may receive from the base station 110 the OFDM symbols including the jamming symbols and the data symbols and the signal including the at least one threshold.

In a reception signal recovery phase S304, the user terminal 120 may process the signals received from the base station 110. For example, the user terminal 120 may perform synchronization with the base station 110 based on signals received from the base station 110. Also, the user terminal 120 may estimate the channel between the base station 110 and the user terminal 120 based on the signals received from the base station 110. Here, the channel between the base station 110 and the user terminal 120 may be the same as or similar to the channel h in FIG. 1.

The user terminal 120 may acquire the at least one threshold from the signal received from the base station 110. Here, the at least one threshold may be at least one of the amplitude threshold and the phase threshold in FIGS. 4 and 5.

Based on the obtained threshold(s), the user terminal 120 may estimate the first subcarrier set $S_D$ through which the data symbols are transmitted and the second subcarrier set $S_j$ through which the jamming symbols are transmitted in the OFDM symbols included in the signal received from the base station 110 through the channel h. For example, the user terminal 120 may estimate the first subcarrier set $S_D$ and the second subcarrier set $S_j$ through one of Equations 1 to 7 based on the obtained threshold(s).

The user terminal 120 may demodulate the OFDM symbols received from the base station 110. The user terminal 120 may decode the data symbols transmitted through the estimated first subcarrier set $S_D$ in the demodulated OFDM symbols.

A wireless communication system according to a second embodiment of the present disclosure may operate in an in-band full-duplex (IFD) scheme. The IFD scheme will be described with reference to FIG. 6 below.

Figure 6:
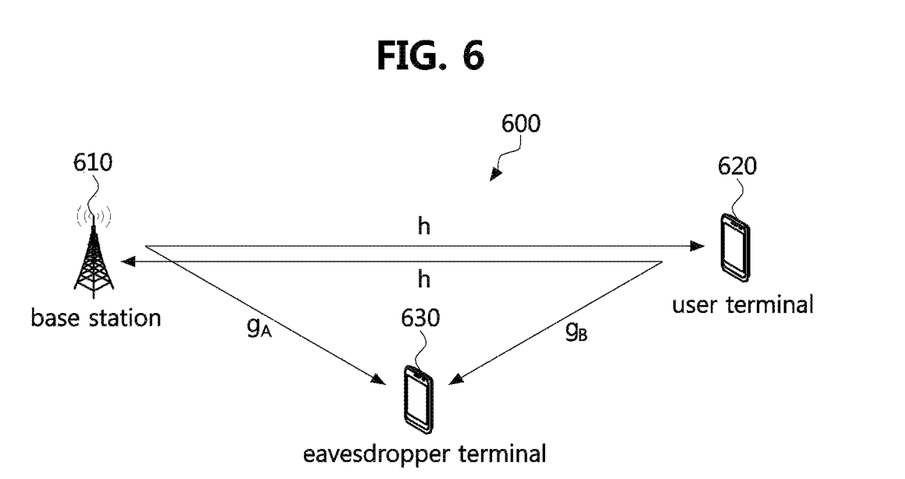
FIG. 6 is a conceptual diagram illustrating an environment where a physical layer security communication is performed in a wireless communication system according to a second embodiment of the present disclosure.

FIG. 6 is a conceptual diagram illustrating an environment where a physical layer security communication is performed in a wireless communication system according to a second embodiment of the present disclosure.

Referring to FIG. 6, a wireless communication system 600 may include a base station 610, a user terminal 620, and an eavesdropper terminal 630. Here, a structure of each of the base station 610, the user terminal 620, and the eavesdropper terminal 630 may be the same as or similar to the structure of the communication node 200 of FIG. 2.

The wireless communication system 600 may operate in the IFD scheme. For example, the base station 610 and the user terminal 620 may transmit and receive data in a channel h simultaneously. Here, the channel h may mean a channel between the base station 610 and the user terminal 620.

That is, the base station 610 may transmit a first signal to the user terminal 620 through the channel h, and at the same time, the base station 610 may receive a second signal from the user terminal 620. The user terminal 620 may also receive the first signal from the base station 610 while transmitting the second signal to the base station 610 through the channel h.

The eavesdropper terminal 630 may receive the first signal transmitted from the base station 610 to the user terminal 620 through a channel $g_A$. Here, the channel $g_A$ may denote a channel between the base station 610 and the eavesdropper terminal 630.

Also, the eavesdropper terminal 630 may receive the second signal transmitted from the user terminal 620 to the base station 610 through a channel $g_B$. Here, the channel $g_B$ may denote a channel between the user terminal 620 and the eavesdropper terminal 630.

Here, the channel h, the channel $g_A$, and the channel $g_B$ may be multipath fading channels whose frequency selectivity is equal to or greater than a predetermined threshold. Also, the base station 610, the user terminal 620, and the eavesdropper terminal 630 may be spaced apart from each other by a predetermined threshold distance or more. Accordingly, the channel h, the channel $g_A$, and the channel $g_B$ may be channels formed independently of each other. Also, a coherence time of each of the channel h, the channel $g_A$, and the channel $g_B$ may exceed a predetermined threshold time.

A frequency domain of the channel h may be denoted by H. Also, a frequency domain of the channel $g_A$ may be denoted by $G_A$. Also, a frequency domain of the channel $g_B$ may be denoted by $G_B$.

For example, when the number of subcarriers (e.g., corresponding a FFT size) is N, H, $G_A$, and $G_B$ may be expressed as follows.

$$H = \text{fft}(h) = [H(0), H(1), \ldots, H(N-1)]$$

$$G_A = \text{fft}(g_A) = [G_A(0), G_A(1), \ldots, G_A(N-1)]$$

$$G_B = \text{fft}(g_B) = [G_B(0), G_B(1), \ldots, G_B(N-1)]$$

Signal flows between the base station 610 and the user terminal 620 operating in the IFD scheme will be described with reference to FIG. 7 below.

Figure 7:
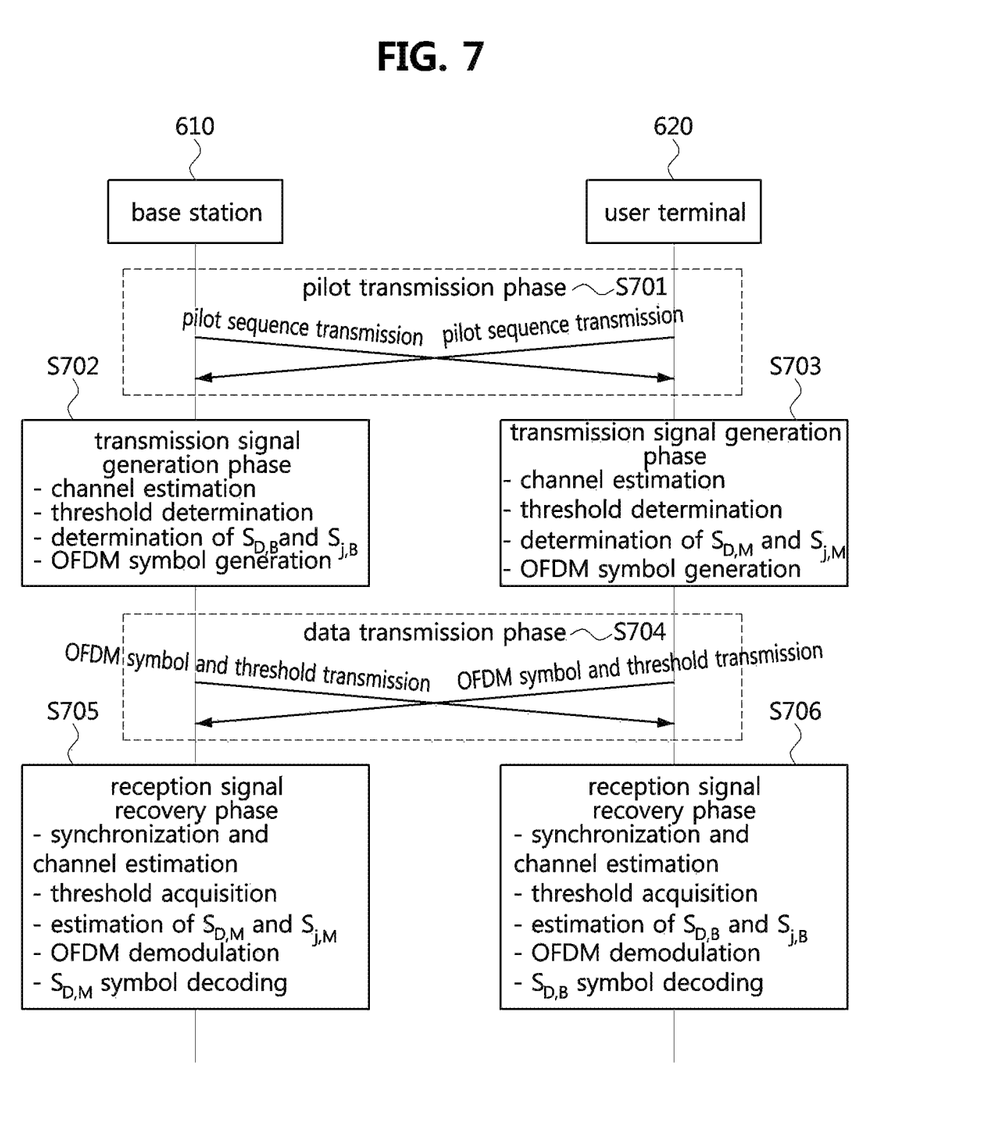
FIG. 7 is a sequence chart illustrating signal flows between a base station and a user terminal in a wireless communication system according to a second embodiment of the present disclosure.

FIG. 7 is a sequence chart illustrating signal flows between a base station and a user terminal in a wireless communication system according to a second embodiment of the present disclosure.

Referring to FIG. 7, a wireless communication system may include a base station 610 and a user terminal 620. Here, the base station 610 may be the same as the base station 610 of FIG. 6. Also, the user terminal 620 may be the same as the user terminal 620 of FIG. 6.

In a pilot transmission phase S701, the base station 610 may transmit a first pilot sequence to the user terminal 620. At the same time, the base station 610 may receive a second pilot sequence from the user terminal 620.

Also, the user terminal 620 may transmit the second pilot sequence to the base station 610. At the same time, the user terminal 620 may receive the first pilot sequence from the base station 610. Here, the pilot sequence may be a preamble sequence.

In a transmission signal generation phase S702, the base station 610 may generate a DL transmission signal including data symbols and jamming symbols. The transmission signal generation phase S702 may be the same as or similar to the transmission signal generation phase 302 of FIG. 3.

The terminal 620 may estimate the channel h between the base station 610 and the user terminal 620 based on the first pilot sequence received from the base station 610 in the transmission signal generation phase.

The user terminal 620 may determine an amplitude threshold or a phase threshold of the frequency domain H of the channel h between the base station 610 and the user terminal 620 based on channel estimation information.

Here, a procedure of determining the amplitude threshold may be the same as or similar to that described with reference to FIG. 4. Further, a procedure of determining the phase threshold may be the same as or similar to that described with reference to FIG. 5.

The user terminal 620 may generate DL transmission signals including data symbols, jamming symbols, and at least one threshold. For example, the user terminal 620 may encode the data symbols in the PSK scheme or the QAM scheme, and map the data symbols to subcarriers included in a first subcarrier set $S_{D,M}$. Also, the user terminal 620 may encode the jamming symbols using random bits in the PSK scheme or the QAM scheme, and map the jamming symbols to subcarriers included in s second subcarrier set $S_{j,M}$. The user terminal 620 may generate OFDM symbols by performing OFDM modulation on the data symbols and the jamming symbols. That is, the user terminal 620 may perform IFFT, and perform a CP addition.

In a data transmission phase S703, the base station 610 may transmit a DL transmission signal including the OFDM symbols and at least one threshold to the user terminal 620. The data transmission phase S703 may be the same as or similar to the data transmission phase S303 of FIG. 3.

In the data transmission phase S703, the user terminal 620 may transmit UL transmission signals including OFDM symbols and at least one of the amplitude threshold v and the phase threshold u to the base station 610. Here, a transmission scheme of the UL transmission signal may be different depending on the wireless communication system.

For example, the wireless communication system may be a WLAN. In this case, the base station 610 may correspond to an AP of the WLAN. The base station 610 may transmit the at least one threshold to the user terminal 620 through a SIG field included in a preamble of a frame. Here, the SIG field may be an HE-SIG field, a VHT-SIG field, or an L-SIG field.

Further, the wireless communication system may be a mobile communication network. For example, the wireless communication system may be a LTE or NR system. The at least one threshold may be transmitted to the base station 610 through a physical uplink shared channel (PUSCH).

The user terminal 620 may transmit the UL transmission signals including the OFDM symbols and the at least one threshold to the base station 610. The base station 610 may receive the UL transmission signals including the at least one threshold and the OFDM symbols from the user terminal 620.

In a reception signal recovery phase S705, the base station 610 may process the signals received from the user terminal 620. For example, the base station 610 may perform synchronization with the user terminal 620 based on the signals received from the user terminal 620. Also, the base station 610 may estimate the channel between the base station 610 and the user terminal 620 based on the signals received from the user terminal 620. Here, the channel between the base station 610 and the user terminal 620 may be the same as or similar to the channel h in FIG. 6.

The base station 610 may acquire the at least one threshold from the signal received from the user terminal 620. Here, the at least one threshold may be at least one of the amplitude threshold and the phase threshold in FIGS. 4 and 5.

Based on the obtained threshold(s), the base station 610 may estimate the first subcarrier set $S_{D,M}$ through which the data symbols are transmitted and the second subcarrier set $S_{j,M}$ through which the jamming symbols are transmitted in the OFDM symbols included in the uplink transmission signal received from the user terminal 620 through the channel h. For example, the base station 610 may estimate the first subcarrier set $S_{D,M}$ and the second subcarrier set $S_{j,M}$ through one of Equations 1 to 7 based on the obtained threshold(s).

The base station 610 may demodulate the OFDM symbols received from the user terminal 620. The base station 610 may decode the data symbols transmitted on the estimated first subcarrier set $S_{D,M}$ of the demodulated OFDM symbols.

In a reception signal recovery phase S706, the user terminal 620 may process the DL transmission signal received from the base station 610. The operation of the user terminal 620 in the reception signal recovery step S706 may be the same as or similar to the operation of the user terminal 120 in the reception signal recovery phase S303 of FIG. 3.

Further, the base station 610 may transmit and receive signals to and from a plurality of user terminals rather than one user terminal 620. An environment in which the base station 610 transmits and receives signals with a plurality of user terminals will be described with reference to FIG. 8.

Figure 8:
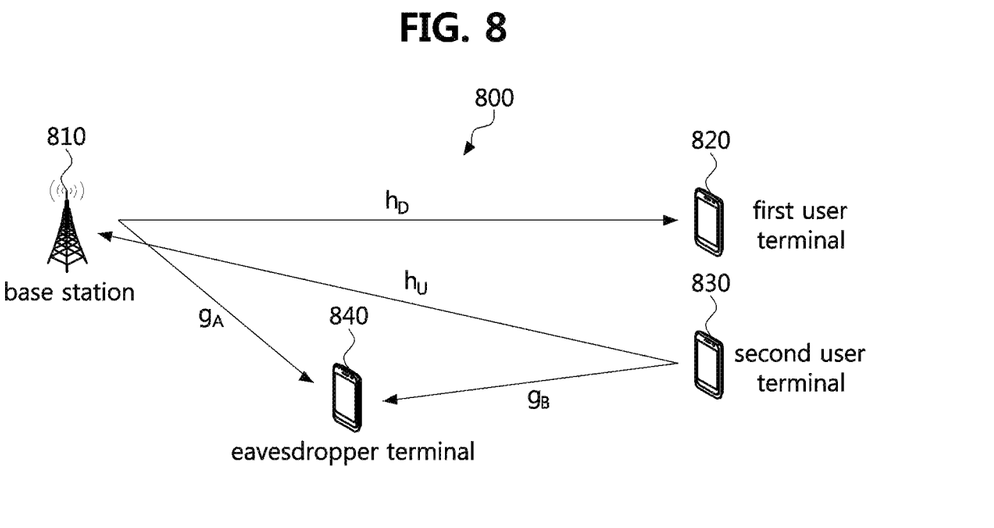
FIG. 8 is a conceptual diagram illustrating an environment where a physical layer security communication is performed in a wireless communication system according to a third embodiment of the present disclosure.

FIG. 8 is a conceptual diagram illustrating an environment where a physical layer security communication is performed in a wireless communication system according to a third embodiment of the present disclosure.

Referring to FIG. 8, a wireless communication system 600 may include a base station 810, a first user terminal 820, a second user terminal 830, and an eavesdropper terminal 840. Here, a structure of each of the base station 810, the first user terminal 820, the second user terminal 830, and the eavesdropper terminal 840 may be the same as or similar to the structure of the communication node 200 of FIG. 2.

The wireless communication system 800 may operate in the IFD scheme. For example, base station 810 may transmit a DL signal to the first user terminal 820 through a downlink channel $h_D$. At the same time, the base station 810 may receive a UL signal from the second user terminal 830 through an uplink channel $h_U$. Here, the first user terminal 820 may be referred to as a DL terminal. The second user terminal 830 may be referred to as a UL terminal.

The eavesdropper terminal 840 may receive the DL signal transmitted from the base station 810 to the first user terminal 820 through a channel $g_A$. Here, the channel $g_A$ may mean a channel between the base station 810 and the eavesdropper terminal 840. Also, the eavesdropper terminal 840 may receive the UL signal transmitted from the second user terminal 830 to the base station 810 through a channel $g_B$. Here, the channel $g_B$ may mean a channel between the second user terminal 830 and the eavesdropper terminal 840.

Here, the channel $h_D$, the channel $h_U$, the channel $g_A$, and the channel $g_B$ may be multipath fading channels whose frequency selectivity is equal to or greater than a predetermined threshold. Also, the base station 810, the first user terminal 820, the second user terminal 830, and the eavesdropper terminal 840 may be spaced apart from each other by a predetermined threshold distance or more. Accordingly, the channel $h_D$, the channel $h_U$, the channel $g_A$, and the channel $g_B$ may be channels formed independently of each other. Also, a coherence time of each of the channel $h_D$, the channel $h_U$, the channel $g_A$, and the channel $g_B$ may exceed a predetermined threshold time.

A frequency domain of the channel $h_D$ may be denoted by $H_D$. Also, a frequency domain of the channel $h_U$ may be denoted by $H_U$. Also, a frequency domain of the channel $g_A$ may be denoted by $G_A$. Also, a frequency domain of the channel $g_B$ may be denoted by $G_B$.

For example, when the number of subcarriers (e.g., corresponding a FFT size) is N, $H_D$, $H_U$, $G_A$, and $G_B$ may be expressed as follows.

$$H_D = fft(h) = [H_D(0), H_D(1), \ldots, H_D(N-1)]$$

$$H_U = fft(h) = [H_U(0), H_U(1), \ldots, H_U(N-1)]$$

$$G_A = fft(g_A) = [G_A(0), G_A(1), \ldots, G_A(N-1)]$$

$$G_B = fft(g_B) = [G_B(0), G_B(1), \ldots, G_B(N-1)]$$

Signal flows between the base station 810, the first user terminal 820, and the second user terminal 830 will be described with reference to FIG. 9 below.

Figure 9:
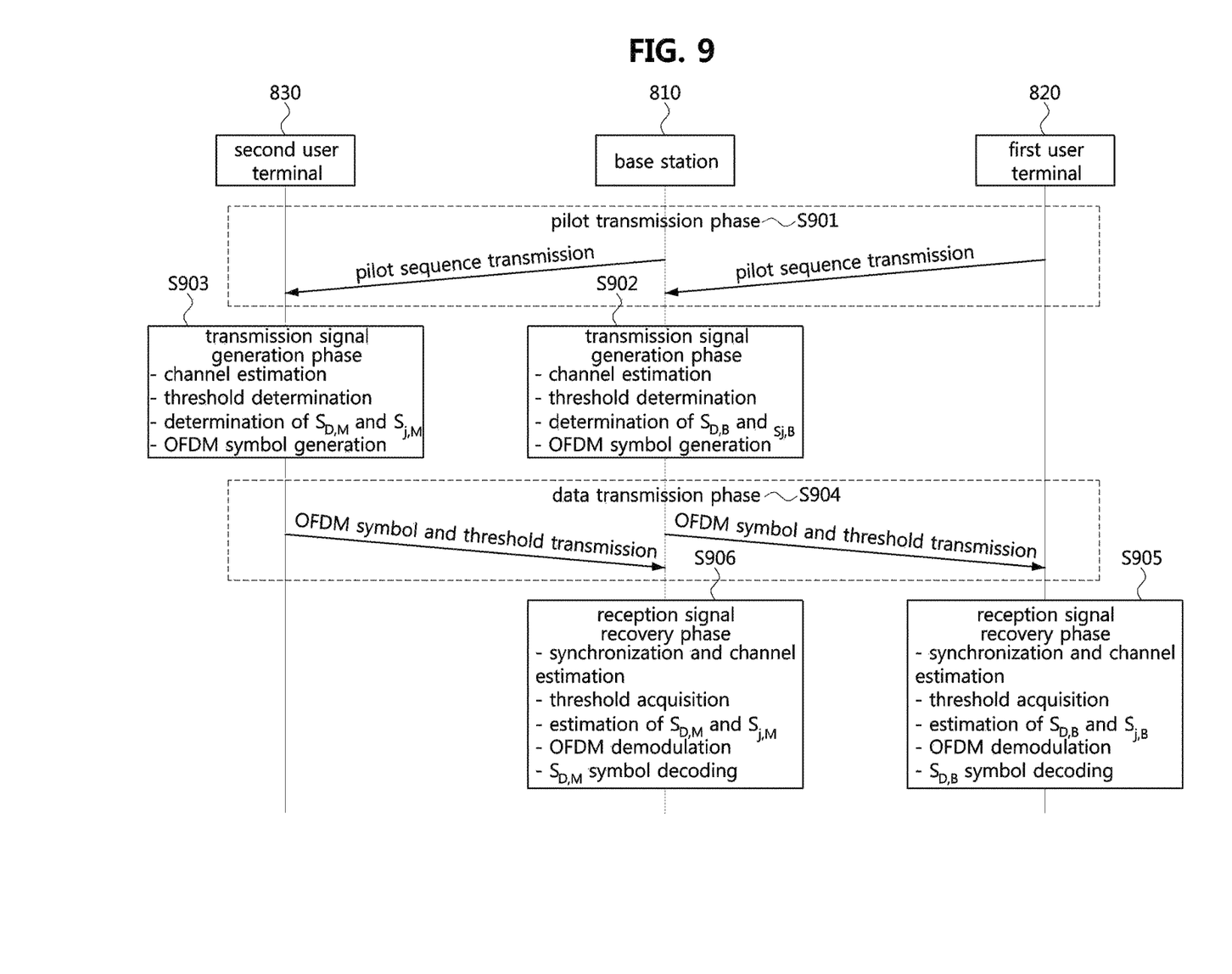
FIG. 9 is a sequence chart illustrating signal flows among a base station and a plurality of user terminals in a wireless communication system according to a third embodiment of the present disclosure.

FIG. 9 is a sequence chart illustrating signal flows among a base station and a plurality of user terminals in a wireless communication system according to a third embodiment of the present disclosure.

Referring to FIG. 9, a wireless communication system may include a base station 810, a first user terminal 820, and a second user terminal 830. Here, the base station 810 may be the same as the base station 810 of FIG. 8. The first user terminal 820 may be the same as the user terminal 820 of FIG. 8. Also, the second user terminal 830 may be the same as the second user terminal 830 of FIG. 8.

In a pilot transmission phase S901, the first user terminal 820 may transmit a first pilot sequence to the base station 810. The base station 810 may receive the first pilot sequence from the first user terminal 820. At the same time, the base station 810 may transmit a second pilot sequence to the second user terminal 830.

In a transmission signal generation phase S902, the base station 810 may generate a DL transmission signal. The operation of the base station 810 in the transmission signal generation phase S902 may be the same as or similar to the operation of the base station 610 in the transmission signal generation phase S702 of FIG. 7.

In a transmission signal generation phase S903, the second user terminal 830 may generate a UL transmission signal. The operation of the second user terminal 830 in the transmission signal generation phase S903 may be the same as or similar to the operation of the user terminal 620 in the transmission signal generation phase S703 of FIG. 7.

In a data transmission phase S904, the base station 810 may transmit a DL transmission signal to the first user terminal 820. At the same time, the base station 810 may receive the UL transmission signal from the second user terminal 820.

The DL transmission signal transmitted by the base station 810 in the data transmission phase S904 may be the same as or similar to the DL transmission signal transmitted by the base station 610 in the data transmission phase S704 of FIG. 7. Also, the UL transmission signal transmitted by the second user terminal 830 in the data transmission phase S904 may be the same as or similar to the UL transmission signal transmitted by the user terminal 620 in the data transmission phase S704 of FIG. 7.

In a reception signal recovery phase S905, the first user terminal 820 may process the DL transmission signal received from the base station 810. The operation of the first user terminal 820 in the reception signal recovery phase S905 may be the same as or similar to the operation of the user terminal 620 in the reception signal recovery phase S706 of FIG. 7.

In a reception signal recovery phase S906, the base station 810 may process the UL transmission signal received from the second user terminal 830. The operation of the base station 810 in the reception signal recovery phase S906 may be the same as or similar to the operation of the base station 610 in the reception signal recovery phase S705 of FIG. 7.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a terminal in a wireless communication system, the operation method comprising:
receiving a preamble sequence from a base station;
estimating an uplink (UL) channel between the terminal and the base station based on the preamble sequence;

determining an amplitude threshold and/or a phase threshold based on the result of estimating the UL channel;

determining a first frequency region for transmitting a data signal and a second frequency region for transmitting a jamming signal in an entire frequency region of the UL channel based on the amplitude and/or the phase threshold; and transmitting to the base station a UL control signal including identification information indicating the amplitude threshold and/or the phase threshold, wherein the identification information indicates the amplitude threshold, the first frequency region is a frequency region in which a signal having an amplitude equal to or greater than the amplitude threshold is transmitted in the entire frequency region of the UL channel, and the second frequency region is a frequency region in which a signal having an amplitude less than the amplitude threshold is transmitted in the entire frequency region of the UL channel; and wherein the identification information indicates the phase threshold, the first frequency region is a frequency region in which a signal having a phase equal to or greater than the phase threshold is transmitted in the entire frequency region of the UL channel, and the second frequency region is a frequency region in which a signal having a phase less than the phase threshold is transmitted in the entire frequency region of the UL channel.

2. The operation method according to claim 1, wherein the identification information indicates a first amplitude threshold and a second amplitude threshold, the first frequency region is a frequency region in which a signal having an amplitude equal to or greater than the first amplitude threshold and less than the second amplitude threshold is transmitted in the entire frequency region of the UL channel, the second frequency region is a frequency region in which a signal having an amplitude less than the first amplitude threshold and a signal having an amplitude equal to or greater than the second amplitude threshold are transmitted in the entire frequency region of the UL channel, and the first amplitude threshold is less than the second amplitude threshold, and the first and second amplitude thresholds are determined based on the result of estimating the UL channel.

3. The operation method according to claim 1, wherein the identification information indicates a first phase threshold and a second phase threshold, the first frequency region is a frequency region in which a signal having a phase equal to or greater than the first phase threshold and less than the second phase threshold is transmitted in the entire frequency region of the UL channel, the second frequency region is a frequency region in which a signal having a phase less than the first phase threshold and a signal having a phase equal to or greater than the second phase threshold are transmitted in the entire frequency region of the UL channel, the first phase threshold is less than the second phase threshold, and the first and second phase thresholds are determined based on the result of estimating the UL channel.

4. The operation method according to claim 1, wherein the identification information indicates the amplitude threshold and the phase threshold, the first frequency region is a frequency region in which a signal having an amplitude equal to or greater than the amplitude threshold and a phase equal to or greater than the phase threshold is transmitted in the entire frequency region of the UL channel, and the second frequency region is a frequency region in which a signal having an amplitude less than the amplitude threshold and a signal less than the phase threshold are transmitted in the entire frequency region of the UL channel.

5. The operation method according to claim 1, wherein the identification information is transmitted to the base station through a physical uplink shared channel (PUSCH).

6. The operation method according to claim 1, wherein the identification information is transmitted to the base station through a signal (SIG) field included in a preamble of a frame.

7. The operation method according to claim 1, further comprising transmitting to the base station a UL transmission signal including the data signal and the jamming signal through the UL channel.

8. An operation method of a base station in a wireless communication system, the operation method comprising:

receiving an uplink (UL) control signal including identification information for identifying a first frequency region in which a data signal is transmitted and a second frequency region in which a jamming signal is transmitted from a terminal through a UL channel, wherein the identification information indicates an amplitude threshold and/or a phase threshold, and the amplitude threshold and/or the phase threshold is determined by the base station on a result of estimating a UL channel between the terminal and the base station;

receiving a UL transmission signal including the data signal and the jamming signal from the terminal through the UL channel;

identifying the first frequency region and the second frequency region among an entire frequency regions of the UL channel based on the identification information; and decoding the data signal received through the first frequency region, wherein the identification information indicates the amplitude threshold, the first frequency region is a frequency region in which a signal having an amplitude equal to or greater than the amplitude threshold is received in the entire frequency region of the UL channel, and the second frequency region is a frequency region in which a signal having an amplitude less than the amplitude threshold is received in the entire frequency region of the UL channel;

wherein the identification information indicates the phase threshold, the first frequency region is a frequency region in which a signal having a phase equal to or greater than the phase threshold is received in the entire frequency region of the UL channel, and the second frequency region is a frequency region in which a signal having a phase less than the phase threshold is received in the entire frequency region of the UL channel.

9. The operation method according to claim 8, wherein the identification information indicates a first amplitude threshold and a second amplitude threshold, the first frequency region is a frequency region in which a signal having an amplitude equal to or greater than the first amplitude threshold and less than the second amplitude threshold is received in the entire frequency region of the UL channel, the second frequency region is a frequency region in which a signal having an amplitude less than the first amplitude threshold and a signal having an amplitude equal to or greater than the second amplitude threshold are received in the entire frequency region of the UL channel, the first amplitude threshold is less than the second amplitude threshold, and the first and second amplitude thresholds are determined based on the result of estimating the UL channel.

10. The operation method according to claim 8, wherein the identification information indicates a first phase threshold and a second phase threshold, the first frequency region is a frequency region in which a signal having a phase equal to or greater than the first phase threshold and less than the second phase threshold is received in the entire frequency region of the UL channel, the second frequency region is a frequency region in which a signal having a phase less than the first phase threshold and a signal having a phase equal to or greater than the second phase threshold are received in the entire frequency region of the UL channel, the first phase threshold is less than the second phase threshold, and the first and second phase thresholds are determined based on the result of estimating the UL channel.

11. The operation method according to claim 8, wherein the identification information indicates the amplitude threshold and the phase threshold, the first frequency region is a frequency region in which a signal having an amplitude equal to or greater than the amplitude threshold and a phase equal to or greater than the phase threshold is received in the entire frequency region of the UL channel, and the second frequency region is a frequency region in which a signal having an amplitude less than the amplitude threshold and a signal less than the phase threshold are received in the entire frequency region of the UL channel.

12. The operation method according to claim 8, wherein the identification information is received from the user terminal through a physical uplink shared channel (PUSCH).

13. The operation method according to claim 8, wherein the identification information is received from the user terminal through a signal (SIG) field included in a preamble of a frame.

14. The operation method according to claim 8, wherein the jamming signal received through the second frequency region is not decoded.

* * * * *